(12) United States Patent
Poor

(10) Patent No.: US 7,054,464 B2
(45) Date of Patent: *May 30, 2006

(54) SYSTEM AND METHOD OF DISTRIBUTION OF DIGITIZED MATERIALS AND CONTROL OF SCORING FOR OPEN-ENDED ASSESSMENTS

(75) Inventor: David D. S. Poor, Meadowbrook, PA (US)

(73) Assignee: NCS Pearson, Inc., Bloomington, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 10/272,469

(22) Filed: Oct. 15, 2002

(65) Prior Publication Data

US 2003/0086586 A1 May 8, 2003

Related U.S. Application Data

(63) Continuation of application No. 09/862,116, filed on May 21, 2001, now Pat. No. 6,466,683, which is a continuation of application No. 09/405,953, filed on Sep. 27, 1999, now Pat. No. 6,256,399, which is a continuation of application No. 08/610,584, filed on Mar. 7, 1996, now Pat. No. 5,987,149, which is a continuation-in-part of application No. 08/345,214, filed on Nov. 28, 1994, now Pat. No. 5,672,060, which is a continuation of application No. 07/911,663, filed on Jul. 8, 1992, now abandoned.

(51) Int. Cl.
*G06K 9/00* (2006.01)
*G09B 7/00* (2006.01)

(52) U.S. Cl. .................. 382/100; 434/322; 434/365

(58) Field of Classification Search ................ 382/100, 382/305, 306, 181; 358/462, 453; 235/435; 345/700, 701, 703–730; 434/112–116, 188, 434/322, 365

See application file for complete search history.

(56) References Cited

U.S. PATENT DOCUMENTS 3,405,457 A * 10/1968 Bitzer ........................ 434/323

(Continued)

FOREIGN PATENT DOCUMENTS

EP 0 171 663 2/1986

(Continued)

OTHER PUBLICATIONS

Author Unknown, "Image Processing of Open–Ended Questions", *Uniscore, Incorporated*: 3 pages (1992).

(Continued)

*Primary Examiner*—Yon J. Couso
(74) *Attorney, Agent, or Firm*—Pauly, DeVries Smith & Deffner, LLC

(57) ABSTRACT

Methods are disclosed for distributing digitized electronic representations of representative responses to non-objective assessment tasks and established scores for the responses to readers in order to train the readers to determine scores for responses in accordance with a scoring criteria, to qualify the readers to determine scores for responses in accordance with the scoring criteria, and to monitor how well a reader is determining scores for such responses in accordance with the scoring criteria. In disclosed embodiments, the methods provide such distribution for multiple scorers on a network located at a single site, for multiple scorers on a network remote from a central site; and scoring by individual scorers remote from the central site. Distribution may be accomplished by transferring data from electronic files using diverse techniques such as magnetic storage discs, CD-ROM, cable or high-speed public communications network, in accordance with the needs of the particular job and setting.

13 Claims, 14 Drawing Sheets

U.S. PATENT DOCUMENTS

| | | | |
|---|---|---|---|
| 3,538,626 A | | 11/1970 | Frank |
| 3,762,072 A | | 10/1973 | From |
| 3,932,948 A | * | 1/1976 | Goddard et al. ............. 434/314 |
| 4,004,354 A | * | 1/1977 | Yamauchi ................... 434/336 |
| 4,151,659 A | * | 5/1979 | Lien et al. .................. 434/178 |
| 4,205,780 A | | 6/1980 | Burns et al. |
| 4,358,277 A | | 11/1982 | Moyers et al. |
| 4,478,584 A | | 10/1984 | Kaney |
| 4,518,267 A | | 5/1985 | Hepp |
| 4,518,361 A | | 5/1985 | Conway |
| 4,553,261 A | | 11/1985 | Froessl |
| 4,627,818 A | | 12/1986 | Von Fellenberg |
| 4,648,062 A | | 3/1987 | Johnson et al. |
| 4,671,772 A | | 6/1987 | Slade et al. |
| 4,694,352 A | | 9/1987 | Ina et al. |
| 4,705,479 A | | 11/1987 | Maron |
| 4,708,503 A | | 11/1987 | Poor |
| 4,715,818 A | | 12/1987 | Shapiro et al. |
| 4,741,047 A | | 4/1988 | Sharpe, II |
| 4,760,246 A | * | 7/1988 | Shepard ...................... 235/454 |
| 4,764,120 A | | 8/1988 | Griffin et al. |
| 4,785,472 A | | 11/1988 | Shapiro |
| 4,789,543 A | | 12/1988 | Linder |
| 4,798,543 A | | 1/1989 | Spiece |
| 4,845,739 A | | 7/1989 | Katz |
| 4,867,685 A | | 9/1989 | Brush et al. |
| 4,878,175 A | | 10/1989 | Norden-Paul et al. |
| 4,895,518 A | * | 1/1990 | Arnold et al. ............... 434/118 |
| 4,908,759 A | | 3/1990 | Alexander, Jr. et al. |
| 4,930,077 A | | 5/1990 | Fan |
| 4,937,439 A | | 6/1990 | Wanninger et al. |
| 4,958,284 A | | 9/1990 | Bishop et al. |
| 4,978,305 A | * | 12/1990 | Kraft .......................... 434/353 |
| 4,996,642 A | | 2/1991 | Hey |
| 5,002,491 A | * | 3/1991 | Abrahamson et al. ...... 434/322 |
| 5,003,613 A | | 3/1991 | Lovelady et al. |
| 5,011,413 A | | 4/1991 | Ferris et al. |
| 5,023,435 A | | 6/1991 | Deniger |
| 5,035,625 A | * | 7/1991 | Munson et al. ............. 434/332 |
| 5,038,392 A | | 8/1991 | Morris et al. |
| 5,054,096 A | | 10/1991 | Beizer |
| 5,058,185 A | | 10/1991 | Morris et al. ........................ |
| 5,059,127 A | | 10/1991 | Lewis et al. |
| 5,072,383 A | | 12/1991 | Brimm et al. |
| 5,086,385 A | | 2/1992 | Launey et al. |
| 5,100,329 A | | 3/1992 | Deesen et al. |
| 5,101,447 A | | 3/1992 | Sokoloff et al. |
| 5,103,490 A | | 4/1992 | McMillin |
| 5,105,354 A | | 4/1992 | Nishimura |
| 5,119,433 A | | 6/1992 | Will |
| 5,134,669 A | | 7/1992 | Keogh et al. |
| 5,140,650 A | | 8/1992 | Casey et al. |
| 5,147,205 A | | 9/1992 | Gross et al. |
| 5,151,948 A | | 9/1992 | Lyke et al. |
| 5,176,520 A | | 1/1993 | Hamilton |
| 5,180,309 A | | 1/1993 | Egnor |
| 5,195,033 A | | 3/1993 | Samph et al. |
| 5,204,813 A | | 4/1993 | Samph et al. |
| 5,211,564 A | | 5/1993 | Martinez et al. |
| 5,258,855 A | | 11/1993 | Lech et al. |
| 5,259,766 A | * | 11/1993 | Sack et al. .................. 434/362 |
| 5,261,823 A | | 11/1993 | Kurokawa |
| RE34,476 E | | 12/1993 | Norwood |
| 5,267,865 A | | 12/1993 | Lee et al. |
| 5,294,229 A | | 3/1994 | Hartzell et al. |
| 5,302,132 A | | 4/1994 | Corder |
| 5,310,349 A | | 5/1994 | Daniels et al. |
| 5,318,450 A | | 6/1994 | Carver |
| 5,321,611 A | | 6/1994 | Clark et al. |
| 5,344,132 A | | 9/1994 | LeBrun et al. |
| 5,376,007 A | | 12/1994 | Zirm |
| 5,379,213 A | | 1/1995 | Derks |
| 5,387,104 A | | 2/1995 | Corder |
| 5,416,312 A | | 5/1995 | Lamoure |
| 5,418,865 A | | 5/1995 | Bloomberg |
| 5,433,615 A | | 7/1995 | Clark |
| 5,437,554 A | | 8/1995 | Clark et al. |
| 5,437,555 A | | 8/1995 | Ziv-El |
| 5,452,379 A | | 9/1995 | Poor |
| 5,458,493 A | * | 10/1995 | Clark et al. ................. 434/322 |
| 5,466,159 A | | 11/1995 | Clark et al. |
| 5,496,175 A | | 3/1996 | Oyama et al. |
| 5,544,255 A | | 8/1996 | Smithies et al. |
| 5,558,521 A | | 9/1996 | Clark et al. |
| 5,565,316 A | | 10/1996 | Kershaw et al. |
| 5,596,698 A | | 1/1997 | Morgan |
| 5,634,101 A | | 5/1997 | Blau |
| 5,647,017 A | | 7/1997 | Smithies et al. |
| 5,672,060 A | | 9/1997 | Poor |
| 5,690,497 A | | 11/1997 | Clark et al. |
| 5,691,895 A | | 11/1997 | Kurtzberg et al. |
| 5,709,551 A | | 1/1998 | Clark et al. |
| 5,716,213 A | | 2/1998 | Clark et al. |
| 5,718,591 A | | 2/1998 | Clark et al. |
| 5,735,694 A | | 4/1998 | Clark et al. |
| 5,752,836 A | | 5/1998 | Clark et al. |
| 5,987,149 A | | 11/1999 | Poor |
| 5,987,302 A | | 11/1999 | Driscoll et al. |
| 5,991,595 A | | 11/1999 | Romano et al. |
| 6,042,384 A | | 3/2000 | Loiacono |
| 6,155,839 A | | 12/2000 | Clark et al. |
| 6,157,921 A | | 12/2000 | Barnhill |
| 6,159,018 A | | 12/2000 | Clark et al. |
| 6,168,440 B1 | | 1/2001 | Clark et al. |
| 6,183,261 B1 | | 2/2001 | Clark et al. |
| 6,193,521 B1 | | 2/2001 | Clark et al. |
| 6,256,399 B1 | | 7/2001 | Poor |
| 6,466,683 B1 | | 10/2002 | Poor |
| 6,558,166 B1 | | 5/2003 | Clark et al. |
| 6,749,435 B1 | | 6/2004 | Clark et al. |
| 2004/0063087 A1 | | 4/2004 | Clark et al. |
| 2004/0086841 A1 | | 5/2004 | Clark et al. |
| 2004/0202991 A1 | | 10/2004 | Clark et al. |

FOREIGN PATENT DOCUMENTS

| | | |
|---|---|---|
| GB | 2 274 932 A | 8/1994 |
| JP | 56-10634 | 1/1978 |
| JP | 3-1709 | 5/1984 |
| JP | 5-74825 | 2/1987 |
| JP | 62-75578 | 4/1987 |
| JP | 404147288 A | 5/1992 |
| WO | WO 90/05970 | 5/1990 |
| WO | WO 99/06930 | 2/1999 |

OTHER PUBLICATIONS

Brown, P. et al., "Validation—Cost Effective External Evaluation", *Australian Journal of Educational Technology*, 6(2): 5 pages (1990).

Draper, S.W. et al., "Integrative evaluation: An emerging role for classroom studies of CAL", Internet: http://www.psy.gla.ac.uk/~steve/IE.html: 17 pages (Aug. 12, 1995).

Draper, S.W., "Observing, Measuring, or Evaluating Courseware", Internet: http://www.psy.gla.ac.uk/~steve/Eval.HE.html: 10 pages (Feb. 18, 1996).

Foxon, M., "Evaluation of training and development programs: A review of the literature", *Australian Journal of Educational Technology*, 5(2): 16 pages (1989).

Gathy, P. et al., "Computer–Assisted Self –Assessment (CASA) In Histology", *Computers & Education*, 17(2): Front cover and 109–116 (1991).

IBM Education Local Area Network and Tools (EdLAN), Tools for education: 16 pages (1991).

IBM Software for Education Catolog, Pre–Kindergarten to Adult Tools for Educations, 86 pages, 1991/92 Edition.

IBM Multimedia Supplement to T.H.E. Journal, Special Issue, 41 pages (Sep. 1991).

IBM Personal Science Laboratory (PSL), IBM Tools For Education, 12 pages (1990).

IBM PS/2® MultiMedia for Microscopic Studies, 4 pages (1991).

Kool, L., "The Scribophone: a graphic telecommunication system", *Philips Telecommunications Revie*, vol. 38, No. 1, 11 pages (Jan. 1980).

Report by Hunter M. Breland and Robert J. Jones entitled "Remote Scoring of Essays" (1988).

Sims, R., "Futures for Computer–Based Training: Developing the Learner–computer interface", *Australian Journal of Educational Technology*, 4(2): 11 pages (1988).

Uniscore brochure entitled "Score Image' Processing of Constructed–Responses, Essays and Writing Samples" (1992).

Uniscore Proposal No. 92–11 to Delaware Dept. of Public Instruction (May 15, 1992).

* cited by examiner

FIG.14

Joseph H. McMann
124 Rosewood Drive
Harrisonburgh, IL 6126

Dear Customer:

In cooperation with UNISCORE, Incorporated, we are surveying our clients to determine their wants and needs for new software.

In addition to specialized software for users of laser printers, we have the latest in OMR systems software and now we can even provide full support for the capture and use of images of assessment information, name and address fields, signatures, and other hand-written data. Output options include on-screen display, laser printed reports, and compressed bit-mapped images in TIFF format.

Your assistance in this project is appreciated.

MeadowBrook Industries, Ltd.

US 7,054,464 B2

SYSTEM AND METHOD OF DISTRIBUTION OF DIGITIZED MATERIALS AND CONTROL OF SCORING FOR OPEN-ENDED ASSESSMENTS

This application is a continuation of application Ser. No. 09/862,116, filed May 21, 2001, and now issued as U.S. Pat. No. 6,466,683; which was a continuation of application Ser. No. 09/405,953 filed on Sep. 27, 1999, and now issued as U.S. Pat. No. 6,256,399; which was a continuation of application Ser. No. 08/610,584 filed on Mar. 7, 1996 and now issued as U.S. Pat. No. 5,987,149; which was a continuation-in-part of application Ser. No. 08/345,214, filed Nov. 28, 1994, and now issued as U.S. Pat. No. 5,672,060; which was a continuation of application Ser. No. 07/911,663, filed Jul. 8, 1992, abandoned; which applications are incorporated herein by reference.

BACKGROUND OF THE INVENTION

This invention relates to apparatus and methods for controlling the scoring or grading of nonobjective assessment materials (such as essays handwritten on paper), using scorers or readers at diverse geographic locations. More particularly, the invention relates to apparatus and methods for allocating appropriate activities to scorers, distributing materials to scorers required for those activities, monitoring scorers' performance in those activities, and recording the results of the scorers' activities. The present invention provides improved control methods for scoring "on screen", a technique marketed under the trademark "ScoreImage". In general, the ScoreImage technique is described in the commonly assigned U.S. Pat. No. 5,672,060 (the disclosure of which is hereby incorporated by reference).

SUMMARY OF THE INVENTION

Scorer Activities in On-screen Scoring

In on-screen scoring, nonobjective assessment materials are scored through the use of digitized images depicting the responses made for the assessment. Such digitized images are displayed on computer screens for scoring or other judgments of the assessment materials.

Through the use of captured images as the representation of the assessment materials, the need to manage and control large amounts of paper in a secure manner is eliminated. The assessment materials themselves can be kept secure at a scanning center, and need not be handled again for any part of the scoring process. Moreover, since no names or other identifying information are sent to scorers with the images of the materials to be scored, student anonymity is assured and a potential source of scorer bias is removed. Each scorer may work on a personal computer or terminal, while work for the scorer can be allocated to that scorer by an independent process.

When a scorer is ready to start or continue a session, the scorer can select from among three types of activities: training, qualifying, or scoring. For each activity, the system provides a particular "batch" or set of assessment items appropriate for that activity.

If supervisory personnel have assigned a scorer to a particular assessment, the scorer can select training and request or select a batch of assessment items appropriate for training or to help the scorer become proficient in assigning correct scores for items in that assessment. These so-called "training batches" consist exclusively of pre-scored items and may provide feedback to the scorer immediately after the scorer enters his or her score. Training batches can be pre-established or designated by supervisory personnel, and a copy of the batch can be made for the scorer, although, alternatively, training batches can be dynamically built upon request. The scorer's performance is recorded in appropriate detail and summary files so that supervisory personnel, that is, project leaders or managers, can identify scorers who are not correctly assessing the training items.

Once a scorer has completed the appropriate set of training activities, the scorer can request a so-called "qualifying batch" of assessment items, so that he or she can demonstrate his or her ability to properly score the particular assessment. "Qualifying batches" consist exclusively of pre-scored items and are used to ensure that the scorer has properly internalized the training so that the scorer provides accurate scores to assessment items. In accordance with the invention, qualifying batches are pre-established by supervisory personnel and a copy of the batch is made for the scorer, although qualifying batches may also be dynamically built upon request. When scoring qualifying batches, unlike training batches, the scorer is typically not informed of his or her performance until after scoring of the batch is completed. After scoring of the batch is completed, the scores entered by the scorer are compared to the predetermined scores, and the scorer's overall performance is compared to a pre-determined standard. The scorer's performance is recorded in appropriate detail and summary files and is made available or reported to project leaders or managers. It may then also be reported back to the scorer. After a scorer completes a required set of one or more qualifying batches, if the scorer's overall performance meets or exceeds the pre-determined standard, the scorer is deemed "qualified" to obtain batches of "live," or unscored assessments to score. On the other hand, if the scorer fails to meet the pre-determined standard, the scorer may be required to perform additional training and take additional qualifying batches or be precluded from further participation. While most projects require that a scorer successfully meet the qualifying requirements once in any given assessment, other projects may require that the scorer take at least one qualifying batch and re-qualify each day or each scoring session.

When a scorer has become qualified, the scorer can request a batch of "live," or unscored, assessment items. Either the entire set or a subset of the assessment items in a so-called "Assessment Scoring File" is examined to find a subset of items which can be assigned to the scorer. Typically, live items to be scored by the reader are randomly chosen from the resulting subset of items. Often, a fixed number or percentage of pre-scored so called "monitoring" items are also selected and are combined with the live assessment items to form a complete "batch" of items to be scored. The scorer then scores each of the assessment items in the batch as described in the above-mentioned application, and the resulting scores or judgments and other information are stored in a "Scorer Batch File". As soon as the scorer completes scoring of a batch, the scored results are processed into the system. Scores given to live assessment items are stored in the appropriate assessment records, and scores given to prescored, or monitoring, items are compared to the predetermined correct score so that the scorer's accuracy and precision can be monitored.

When the scorer completes work on any batch, the system creates several records that become part of the permanent project records. These records permit accounting for each scorer's activities, as well as permitting evaluation of scorers.

Remote Scoring

In the above-mentioned patent, procedures were disclosed involving the sending of batches to scorers at remove sites via diskettes, with the results of scoring communicated back to the central site via regular telephone lines and computer modems.

(a) Distributing Materials to be Scored

For most batches, the files containing the images for the assessments to be scored will not fit on a single diskette, so that on-screen scoring at remote sites based on sending to scorers diskettes of materials to be scored is somewhat difficult to control and not entirely satisfactory.

The present embodiments of the invention, therefore, provide apparatus and methods to ensure that the images and other files needed for scoring are readily available to scorers when the work is started. This aspect of the invention, then, relates to the distribution of materials to scorers for scorers in a variety of settings and for projects with a variety of special needs, with emphasis on the use of scorers at diverse locations.

(b) Controlling Materials and Accountability of Scorers

Another aspect of the present invention is in the area of controlling materials and providing techniques of holding scorers accountable for their activities. The time delays involved in sending out diskettes containing batches to be scored can sometimes hamper control and management of a scoring project. In order to provide control of the materials and oversight of the scorers and the materials, it is best to allocate work to a scorer immediately before the scorer begins that work, and important that the results of that work be processed and evaluated before additional work is allocated to the scorer, so that the scorer is held accountable for his or her activity. This step of evaluation before allocating additional work is important to avoid allocating additional work to a scorer who has not given correct scores to the items he or she has scored. The process of evaluation also permits supervisory personnel to timely identify scorers who need additional training and requalification, or scorers who should be removed from the project.

The present invention therefore provides as one of its aspects, apparatus and methods to allocate to each scorer items to be scored immediately before the scorer begins working on those items, and thereafter, only after processing and evaluating all work already completed by the scorer. In addition, the present invention provides apparatus and methods to collect information for proper management and control of the scoring process, and provides apparatus and methods to ensure proper security of all information used within a scoring project.

(c) Settings for Scorers

It has heretofore been suggested that the invention be implemented by an arrangement in which computers are connected together in a network and an alternative arrangement in which scorers use a series of independent (non-interconnected) computers, generally at diverse locations. As is described below, the present invention contemplates and can exploit to advantage several different settings for scorers. Such settings include both physical proximity to a central site and particular techniques for distribution of materials and control of the open ended scoring process.

(i) Network Scoring

The preferred embodiment of the above-mentioned patent was an apparatus and method based on a series of independent (non-interconnected) computers. An alternative embodiment utilized a local area network ("LAN") in which all computers used by scorers are connected to a common LAN. In this so-called "Network Scoring" setting, the items to be scored are stored in a Scorer Batch File which is created as a file on the network. Within the Scorer Batch File, each record points directly to one or more images in the image database (the "ImageBase") so there is no need to create a special file of the images to be scored in that batch. During scoring, then, the images are drawn directly from the ImageBase of assessment item images, and the scored results or judgments are stored directly into the Scorer Batch File. Security issues are addressed in the Network Scoring setting by providing workstations that can only be used by scorers for training, qualifying, and scoring functions. By providing only "diskless" computers that automatically connect to the network, scorers are blocked from making any copies of the programs or assessment materials, and carefully designed login scripts and menus restrict scorers to access only to specific programs and files.

(ii) Remote Scoring in Groups

For groups, or clusters, of remote scorers, a Remote Network Scoring" setting can be used. This process is based on a semi-autonomous remote LAN for providing scoring. In this setting some or all of the ImageBase files and a copy of the Assessment Control File, are transferred from the primary scoring site to the remote network. Those skilled in the art will recognize that this transfer can be accomplished by high-speed data lines, magnetic tape, or other high volume storage devices. Once these files have been loaded in the remote LAN, the remote LAN and a central LAN at the primary scoring site (hereafter referred to as the "central site LAN") are connected via a telephone link through a control program running as a node on the central site LAN which has access to files at the remote LAN. When processing, scorers at the remote network site have exactly the same interaction as scorers at a central site, but are not connected directly to the central site LAN. Requests from scorers are forwarded over telephone lines to the central site, batches are constructed at the central site, and the batches are stored directly on the remote LAN. From then on, all scoring functions are performed as they would be on a central Network Scoring system, and the images are drawn directly from the copies of the ImageBase files which have been copied to the remote network's file system.

In this setting, then, all file transfers are controlled and managed by computers at the central site LAN, and remote personnel are not given access to management files unless explicitly sent from the central site LAN to the remote LAN by project supervisory personnel.

(iii) Individual Remote Scoring

The present invention involves three distinct settings for individual remote scoring, each based on its own apparatus and method, and each appropriate for specific project needs. The first two are especially useful and desirable for projects requiring rapid responses and quick turnaround. The third is ideally suited for projects without such extreme time constraints but for which large numbers of assessments are prepared for scoring at one time.

[a] Individual Remote Scoring with Rapid Response

Some scoring projects require extremely rapid response, a need that cannot be met by diskettes or any physical delivery to scorers. Moreover, the bandwidth of standard analog telephone is often insufficient to transmit images quickly enough for viable scoring, so that file transfer by modem in lieu of diskettes is not a viable option. Projects requiring extremely rapid response might include applications in which scores are needed the same day as when the applicant is tested. The present invention therefore provides, in one of its aspects, apparatus and methods for two alternative settings whereby a centrally located computer system provides the distribution of materials to be scored to readers in a rapid fashion, so that scores can be quickly calculated with control over the distribution processing and security of the scoring process.

Fast Communications

One aspect of this invention, then, is based on the utilization of new technologies for the transfer of images for rapid response scoring projects. In this setting, new high-speed digital data lines (ISDN), highspeed connections to the Internet, or other technologies (e.g. cable systems) are used to transfer data in lieu of traditional dial-up telephone lines or diskettes.

Text in Lieu of Images

A second aspect of this invention capable of rapid scoring is based on the compressed character strings of text in lieu of bit-mapped images to transmit open ended assessments involving text materials. The assessment can either be created as text by the respondent typing the response directly into a computer, or the text can be derived from a captured image and converted to text by key-entry based on the image of the response at the central site as soon as the image of the written response is received. This procedure permits scoring based on images received by facsimile transmission as well as text received by direct electronic transfer from the testing site.

Once in text form, the written response is compressed, possibly using known secure encryption procedures, and then placed into a file similar to the files used to store bit-mapped images. A subset of the file is sent to the remote scorer using either standard telephone lines or other high speed alternatives. Using this method, then, the ImageBase is composed of compressed/encrypted text in lieu of bit-mapped images of handwriting, so that the size of the ImageBase needed for each scorer's batch is minimized and can easily be transferred using conventional analog telephone lines and conventional modems.

(a) Individual Remote Scoring with Large Image Files

For projects with few time constraints, but large files of bitmapped images, traditional telephone systems can be utilized if each scorer is provided with a large set of images that the scorer might need to score. The present invention therefore provides apparatus and methods to transfer large sets of responses to individual scorers using recordable CD-ROMS or other high capacity removable random access storage media. In this setting, each scorer is sent a CD-ROM with all the images that reader might need to view during any of the activities (training, qualifying, or scoring). Once the scorer inserts the appropriate storage media in the appropriate drive, such as a CD-ROM, all images are read directly from the storage media, thereby removing the need to receive transfer of images during processing.

(b) Security of Materials

In addition to the considerations of materials distribution and control of the scoring process, the present invention also provides apparatus and methods to control and secure all data and file access for scorers in all the settings, with special emphasis on data and file transfers for telecommunications using public telephone lines and modems in the various settings that are covered.

The present invention, therefore, provides apparatus and methods to connect users to a network while ensuring absolute security for the operation of the network and of the data on the network.

(i) Network Settings

For users on a LAN, diskless computers and tightly controlled access to programs and data files ensure that scorers have access only to files that they need and that scorers have no ability to view, copy, or modify any files except through the normal activities as described above.

(ii) Individual Remote User Settings

Traditional modem applications, either file transfer programs with or without bulletin boards or remote network connections, have inherent deficiencies for controlling remote scoring, and therefore the present invention utilizes novel apparatus to ensure security of materials.

Even with appropriate scripts, file transfer programs and bulletin boards require more expertise than many scorers can be expected to have, and there is the opportunity for scorers to make errors in the uploading and downloading of files. Furthermore, extensive procedures need to be implemented to ensure that each scorer has access only to his or her files, and to ensure that a sophisticated computer user could not modify a script to gain access to files that should remain secure.

Remote network connections involve security problems that arise when users control the execution of programs on the network, and extensive security precautions would be required to prevent sophisticated computer users from gaining access to files and programs that should be secure.

For individual remote users, then, in accordance with the present invention, all electronic communications are directly controlled by a program running on a node of the central network and acting as both a firewall against unauthorized access and as a manager of all communications to authorized scorers. This program handles all components of file access and control for all remote individual users; it ensures that only valid scorers are connected, and the program itself performs all file access to files on the network so that there can be no unauthorized access to project files. By using encrypted compressed text files when text is used in lieu of images, the system further ensures that no identifying information is transmitted in standard ASCII or text format.

DESCRIPTION OF THE DRAWINGS

There are seen in the drawings forms of the invention which are presently preferred (and which constitute the best mode contemplated for carrying the invention into effect), but is should be understood that the invention is not limited to the precise arrangements and instrumentalities shown.

FIG. 14 depicts a form having a printed name and address and codes to identify the individual named on the document.

DETAILED DESCRIPTION OF THE INVENTION

Figure 1:
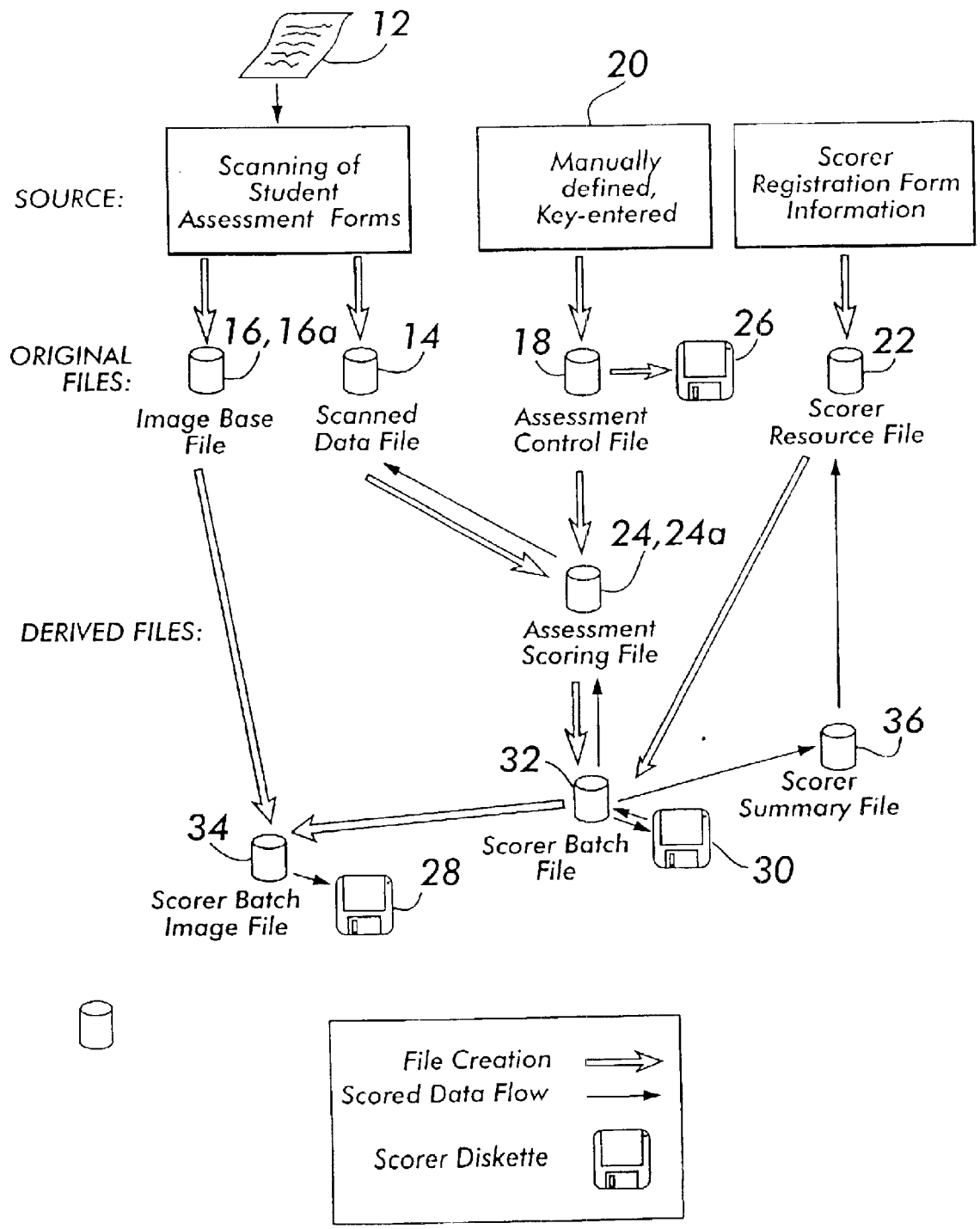
FIG. 1 is a flow diagram, depicting the interrelationship among the computer files used in one embodiment of a system for distribution and control of scoring non-objective materials on screen.

Referring now to the drawings, wherein like reference numerals indicate like elements, FIGS. 1 through 11 depict the flow of data through the several files of the invention using on-screen scoring of nonobjective assessment items in different embodiments and settings.

Referring now to FIG. 1, the reference numeral 10 designates, generally, a system for distribution and control of scoring non-objective materials on-screen.

An assessment form 12, completed by a respondent, such as a test taking student, is scanned, at 14 using techniques heretofore disclosed or otherwise known to those skilled in the art.

In the preferred embodiment, two files are created in the scanning process: (a) a Scanned Data File 14, of information derived from OMR processing, and (b) a file 16 of captured images in digitized form (sometimes hereafter referred to as an "ImageBase File"). In the presently preferred embodiment, the scanned data records are stored in a fixed-record format.

In the scanning process, completed identification fields, such as those for respondent's name, date of birth, identification number and sex are typically processed, converted into characters representing the intended responses, and stored in the Scanned Data File 14.

FIG. 14 discloses a method of identifying the respondent using a "turnaround document." In this alternative method, the form 31 containing the identifying information is completed before being provided to the respondent. In the example depicted, the form is appropriate for OMR processing although other methods could be used. In the example in FIG. 14, the respondent's name and address 35 are printed on the form (preferably using laser printer technology) along with a series of codes 33 from which an identifying number for the respondent can be derived. Once the respondent's identifying number is known, the respondent's name, address and other information can be derived from existing data files.

As completed objective test item responses or other OMR fields for objective test items are scanned, they are converted into characters representing the intended responses, and also stored in the Scanned Data File 14.

For each assessment form 12 scanned, at least one captured image will be placed in the ImageBase File 16. It will be understood that each image in the ImageBase File 16 is stored in digitized bit-mapped or compressed bit-mapped format with appropriate header control information. The location of the header relative to the start of the ImageBase File 16, that is, the "offset" for that image, is stored in the Scanned Data File 14.

Figure 13:
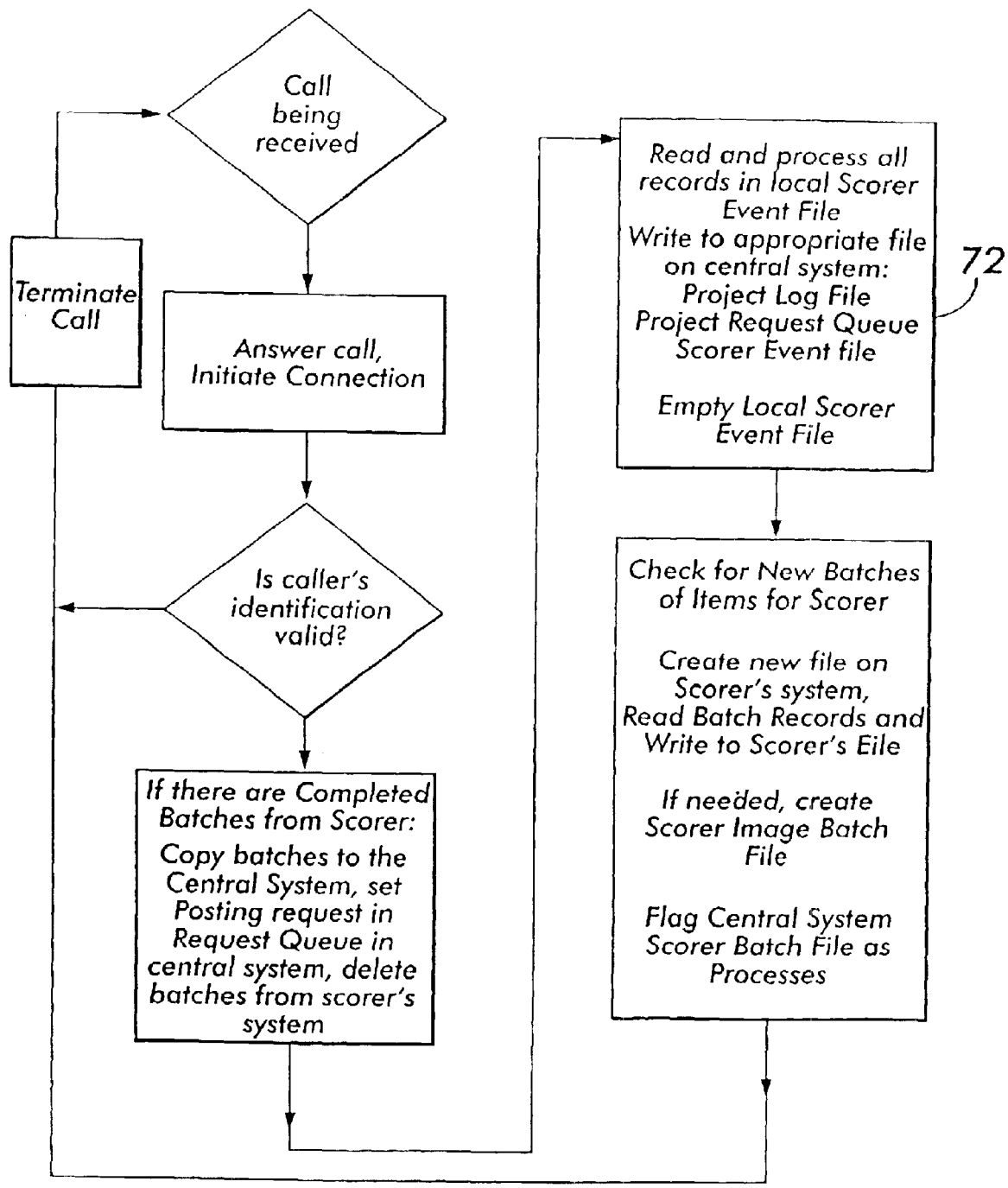
FIG. 13 is a flow chart of a program to control all electronic communications between a remote scorer and the central site.

Referring again to FIG. 1, an Assessment Control File 18 is created using a word processor, editor, or appropriate file creation software symbolized by the reference numeral 20. The Assessment Control File 18 controls the data processing of the files. The contents of Assessment Control File 18 are shown in FIG. 13 of U.S. Pat. No. 5,672,060.

Referring again to FIG. 1, potential scorers are solicited and asked to complete a registration form. Information from such forms is processed using one of (a) keyed data from non-scannable forms, (b) scanned data from a scannable OMR form, or (c) data loaded directly from data keyed directly into a computer by the potential scorer. The scorer registration information is then loaded into a Scorer Resource File 22, which contains information for each potential scorer and may vary in content from project to project.

For convenience, the Scanned Data File 14, ImageBase File 16, Assessment Control File 18 and Scorer Resource File 22 may be referred to as "original files".

Preparation of Assessment Scoring File

As shown in FIG. 1, an Assessment Scoring File 24 is created from the Scanned Data File 14 and the Assessment Control File 18. In the process of creating the Scanned Data File 14, a separate record is created for each assessment to be recorded for each scanned assessment form 12. The presently preferred embodiment of the system also includes fields to store the results of scoring in the Assessment Scoring File 24. Once all or part of the Assessment Scoring File 24 has been created, supervisory personnel such as project managers or other experts can examine an arbitrary subset of the captured images to identify particular assessment responses appropriate for training, qualifying and monitoring ("validity") functions. Preferably, selected items will be coded in the Assessment Scoring File 24 as "Training" or "Validity" items. A correct score or grade will be entered for each training or validity item based on the expert's judgments.

If desired, respective separate ImageBase Files 16a and Assessment Scoring Files 24a can be maintained, as the case may be, for "live" assessment items to be scored, for training items, for qualifying items and/or validity or monitoring items. Whether stored in a common Assessment Scoring File 24 or in multiple such files, the assessments, training items, qualifying items and validity items must be properly identified within scorer batches and the appropriate locations of the corresponding images must be determined from the batch. In the currently preferred embodiment, all unscored assessments are stored in the Assessment Scoring File 24 and corresponding ImageBase 16, while all pre-scored items are stored in a separate Assessment Scoring File 24a and all corresponding images are copied into a corresponding pre-scored ImageBase File 16a. Other arrangements will occur to those skilled in the art. For reasons of simplicity, FIGS. 3 through 11 showing the general flow do not make these distinctions; all ImageBase Files are represented by the reference numeral 16 and all Assessment Scoring Files are represented by the reference numeral 24.

Distribution and Control of Assessment Materials

In all of the embodiments shown in FIGS. 1 through 11, requests from scorers, allocation and control of materials, and processing of scorer information is accomplished by a control program, running on a node on the central network. The general flow of this program is seen in FIG. 13.

Distribution of Material in Diskette

In the embodiment shown in FIG. 1, data files are transferred by diskettes 26, 28, 30 via mail or courier service, although, as has been pointed out above, such techniques are not considered the optimum.

Figure 2:
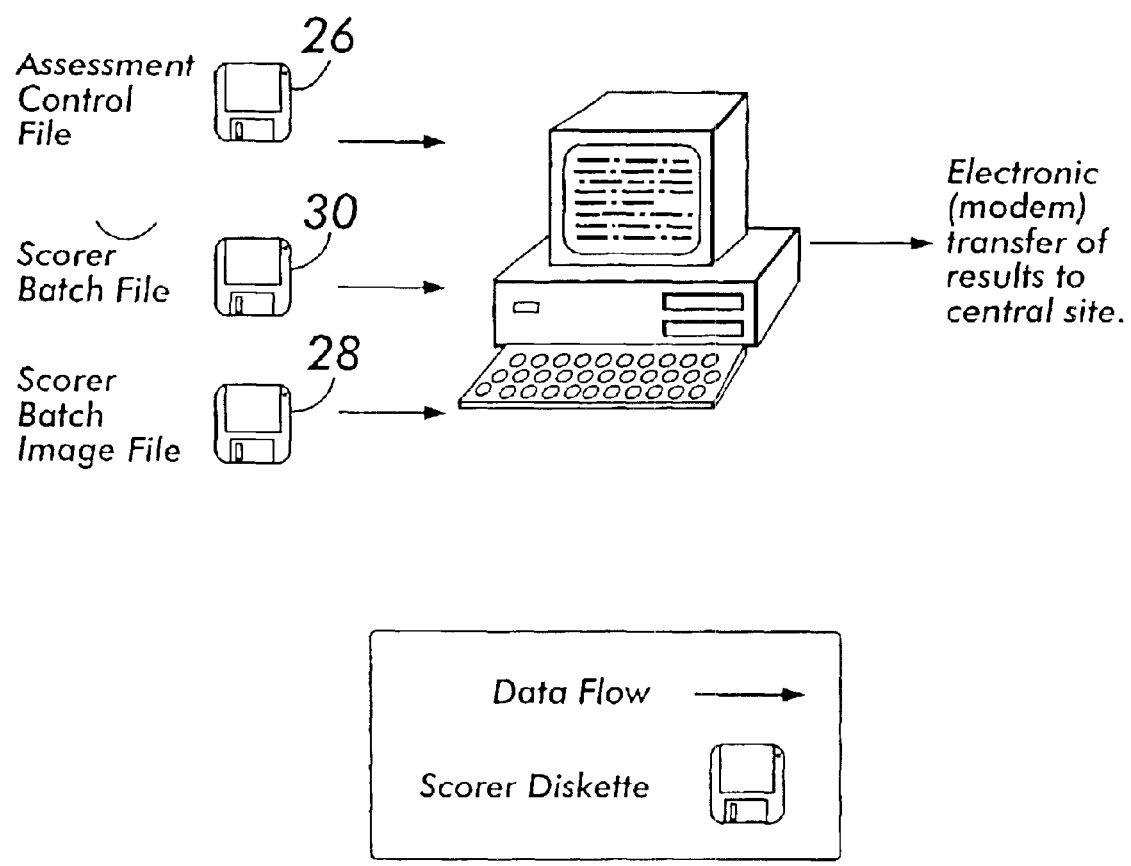
FIG. 2 is a block diagram, showing files and data flow during scoring on screen.

Referring now to FIGS. 1 and 2, when the scorer receives a set of images to be scored, the files containing the images are placed in the scorer's computer. Typically such files are copied to the scorer's computer's hard drive or mass storage media. Under either manual control or program control, the several images can then be displayed on the computer screen one at a time so that the scorer can examine the image of the written materials.

Each scorer's "batch" may consist of a series of images stored in a single Batch Image File 34, or other equivalent arrangements may be used. A companion file, called the Scorer Batch File 32, is suitable for traditional data processing, and typically contains one record corresponding to each image. This companion file 32 provides sequencing and identifying information for each image as well as the location of the corresponding image in the Scorer Batch-Image File 34, copied from the diskette 28, and the locations in which the scorer's judgments can be stored. As indicated above, the batch typically includes training, qualifying and validity items, in addition to "live" assessment items.

Sets of assessments are selected for each scorer from Assessment Scoring File 24. At least one set typically will be made up exclusively of training items so that the scorer can become familiar with the scoring criteria. Another set typically will be made up predominantly of validity items so that the scorer can demonstrate mastery of the scoring procedures so that they become eligible to be sent materials for actual scoring. The requirements will vary from project to project, but will typically require at least 80% correct scoring of the validity items.

After a scorer has demonstrated mastery by correctly scoring training items, the scorer is given access to assessment materials to score. Referring again to FIG. 1, a Scorer Batch File 32 is prepared for the scorer based on information in his or her record in the Scorer Resource File 22. Depending on information relating to that scorer, a series of records is prepared from information in the Assessment Scoring File 24 typically consisting of "live" assessment items and validity items.

At the same time that the Scorer Batch File 32 is created, the student information in the Assessment Scoring File 24 is used to access the corresponding records in the Scanned Data File 14. From the Scanned Data File 14, the offsets for each image are obtained. Based on these offsets, the corresponding records are read from the ImageBase File 16 and these images are then stored in a Scorer ImageBase File 34. The corresponding new offset for each image in the Scorer ImageBase File 34 is saved in the corresponding record of the Scorer Batch File 32.

The present invention provides, in each of its embodiments, a process of recording judgments using the same computer on which the image is displayed. In this process, when a scorer or reader is ready to record his or her judgment, the scorer presses a key on the computer keyboard to call up a "window" in which judgments can be displayed. Then, by entering appropriate digits or codes using the keyboard, the scorer can record the judgments. The entered judgments are simultaneously displayed with appropriate identifying information in the window on the computer screen.

Once all items have been scored, the Scorer Batch File 32 is returned to the central office, preferably through telecommunications. When the file is received, summary statistics will be calculated and posted to the corresponding scorer record in a Scorer Summary File 36. Only if performance on embedded validity items is in an acceptable range is the scorer deemed to be reliable and the assessment judgments (scores) on live assessment items are transferred to the Assessment Scoring File 24.

Distribution of Material with Network Scoring

When a scorer is ready to perform an activity, the scorer makes a request for a batch, and the scorer's request is stored in Project Request Queue 40. When a scorer wants to complete a training batch, he or she selects an appropriate template batch, and then processes or scores that batch. When a scorer wants to complete a qualifying batch an appropriate template is copied to become a scorer-specific qualifying batch, or scorer batch file 32. When a scorer requests a batch of "live" assessments, the Scorer Resource File 22 is examined to determine the scorer's eligibility (that is, qualification) to score items, and then some or all of the items in the Assessment Scoring File 24 are examined to identify items that the scorer is qualified to score. The Scorer Batch File 32 sent to the network scorer is made up of live assessment items to be scored, with or without previously scored validity items which may be included to test the ongoing accuracy of the scorer.

Figure 3:
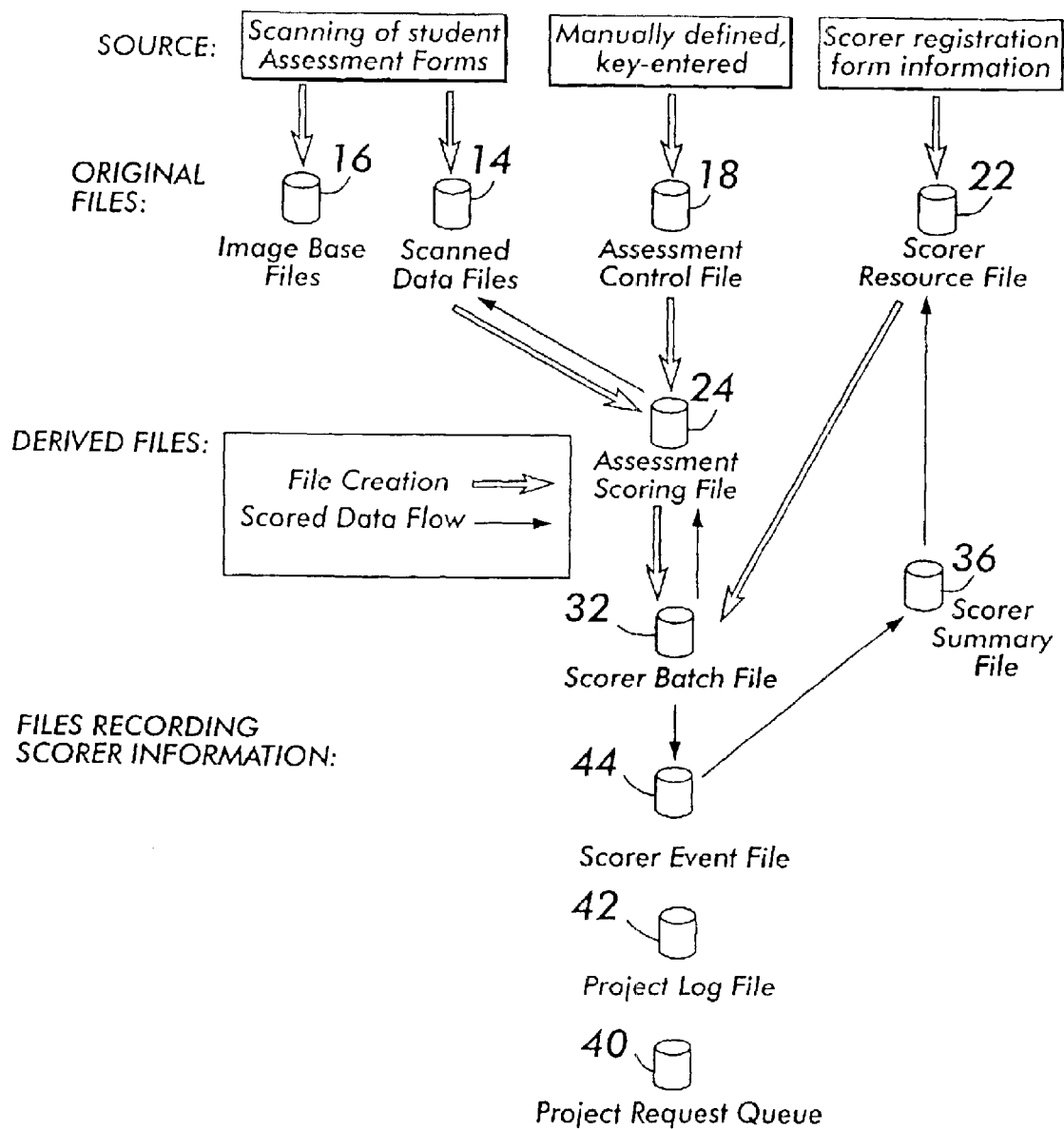
FIG. 3 is a flow diagram, depicting the interrelationship among the computer files used in a system for scoring nonobjective assessment materials in a network setting.

In network scoring as depicted in FIG. 3, each record in the Scorer Batch File 32 points back to a stored image in the ImageBase File 16.

Figure 4:
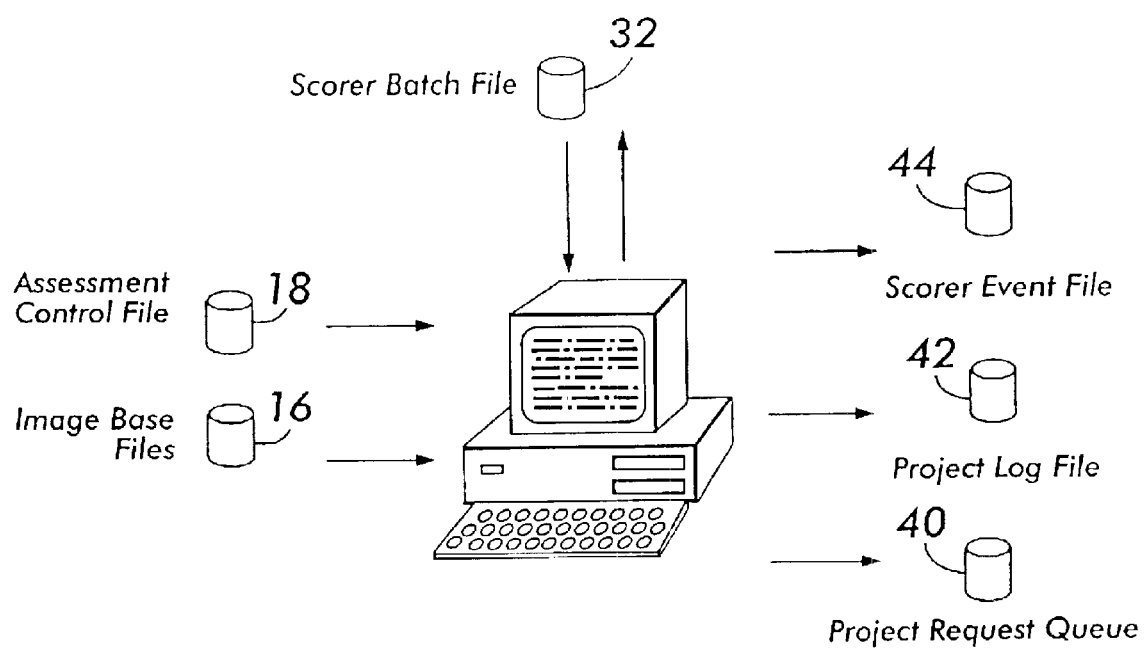
FIG. 4 is a block diagram, showing files and data flow during network scoring.

As shown in FIG. 4, all of the files needed to perform the requested activity are directly accessible to the scorer's system and the results of the scorer's actions are stored directly into network files.

Distribution of Materials for Remote Network Scoring

Figure 5:
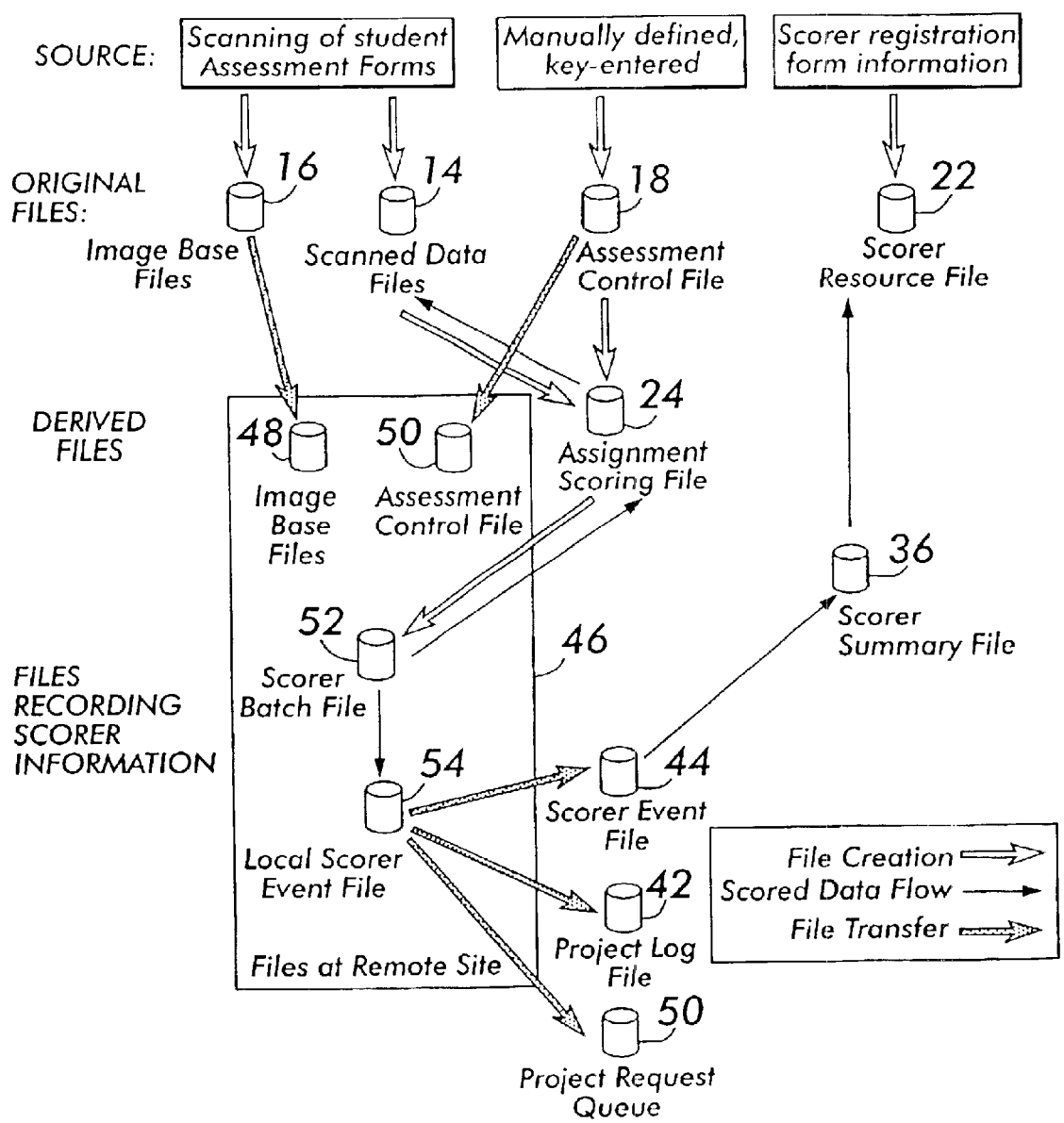
FIG. 5 is a flow diagram, depicting the interrelationship among the computer files used in a system for processing nonobjective assessment materials in a remote network setting.
Figure 6:
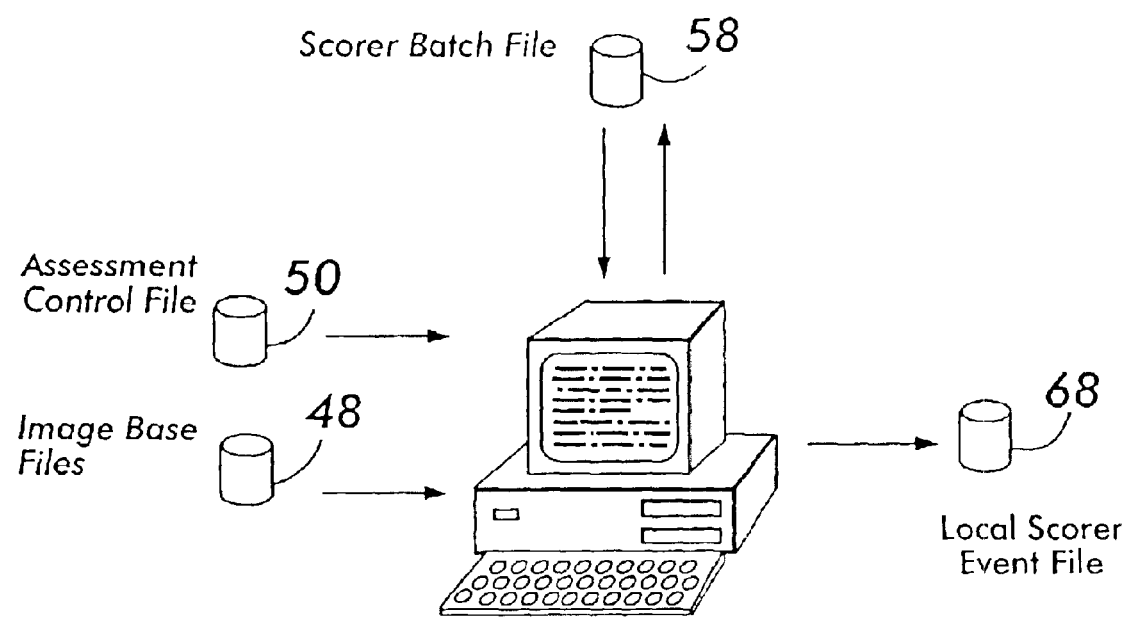
FIG. 6 is a block diagram, showing files and data flow during scoring in a remote network setting.
Figure 6:
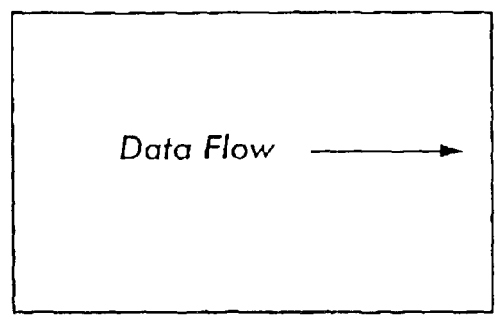

FIGS. 5 and 6 illustrate what may be described as remote network scoring. In such an arrangement, a remote network, designated generally by the reference numeral 46, is situated at a site (the "remote site") remote from the location of original ImageBase File 16, Scanned Data File 14, Assessment Scoring File 24, Assessment Control File 18 and Scorer Resource 22 File. Within the remote network 46 are ImageBase 48, Assessment Control 50, Scorer Batch 52 and Local Scorer Event 54 files, the contents of the ImageBase 48 and Assessment Control 50 files having been transferred from the corresponding files 16 and 18 at a central site. The Scorer Batch File 52 is stored directly in the remote network 46, and each record in the Scorer Batch File 52 also points to the same images as with the above-described Network Scoring. However, in the remote network embodiment shown in FIG. 5, images are accessed through the Image-Base file 48, in the file system of the remote network 46, copied from the ImageBase file 16. After the scorer has completed an activity, the scorer's actions and judgments are taken from the Local Scorer Event File 54 and Scorer Batch File 52 and processed into the appropriate files on the central system, including Assessment Scoring File 24, the Scorer Event File 44, Project Log File 42 and the Scorer Summary File 36.

Individual Remote Scoring with High Speed Electronic Distribution

In individual remote scoring with high speed electronic distribution (FIGS. 7, 8, 9 and 10), a separate subset of images is created for each Scorer Batch File 32, and each record in the Scorer Batch File 32 points to a stored image (FIG. 7) or stored compressed text (FIG. 9) in a Scorer Batch Image File 56. The Scorer Batch Image File 56 consists of images or compressed text extracted from the central ImageBase file. Referring again to FIG. 9, once the Scorer Batch File 32 is created, both the Scorer Batch File 32 and the Scorer Batch Image File 56 are electronically transmitted by means of the central control system 72 to like files 58 and 60 in the scorer's computer. After the scorer has completed an activity, the scorer's actions and judgments are taken from the local Scorer Event File 68 and Scorer Batch File 58 and processed into the appropriate files on the central system, including the Assessment Scoring File 24, the Scorer Event File 44, the Project Log File 42 and the Scorer Summary File 36.

Individual Remote Scoring with Large Image Files

Figure 11:
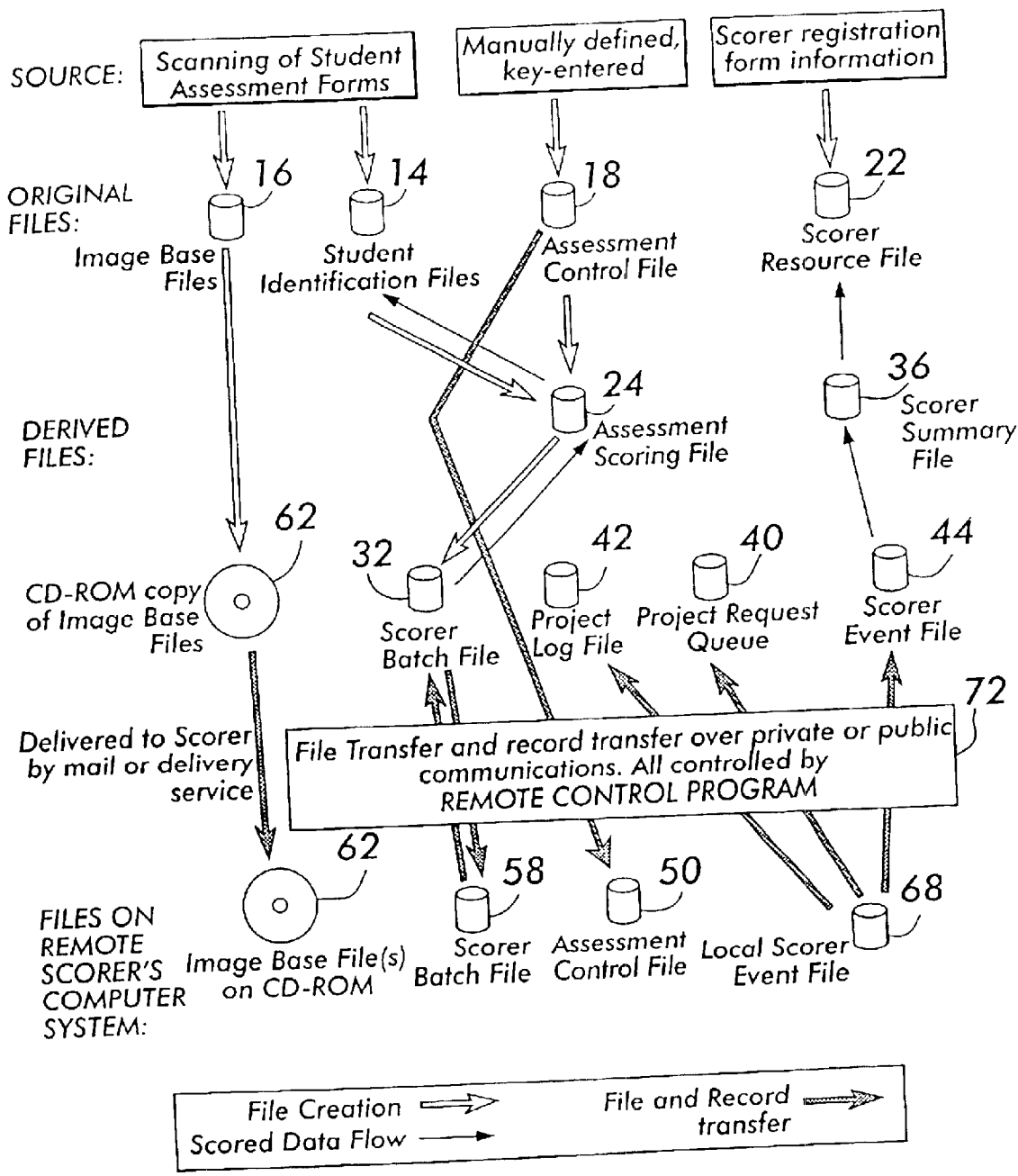
FIG. 11 is a flow diagram, depicting the interrelationship among the computer files used in a system for processing nonobjective assessment materials in a setting with individual remote scoring and distribution of large sets of assessment items to scorers.
Figure 12:
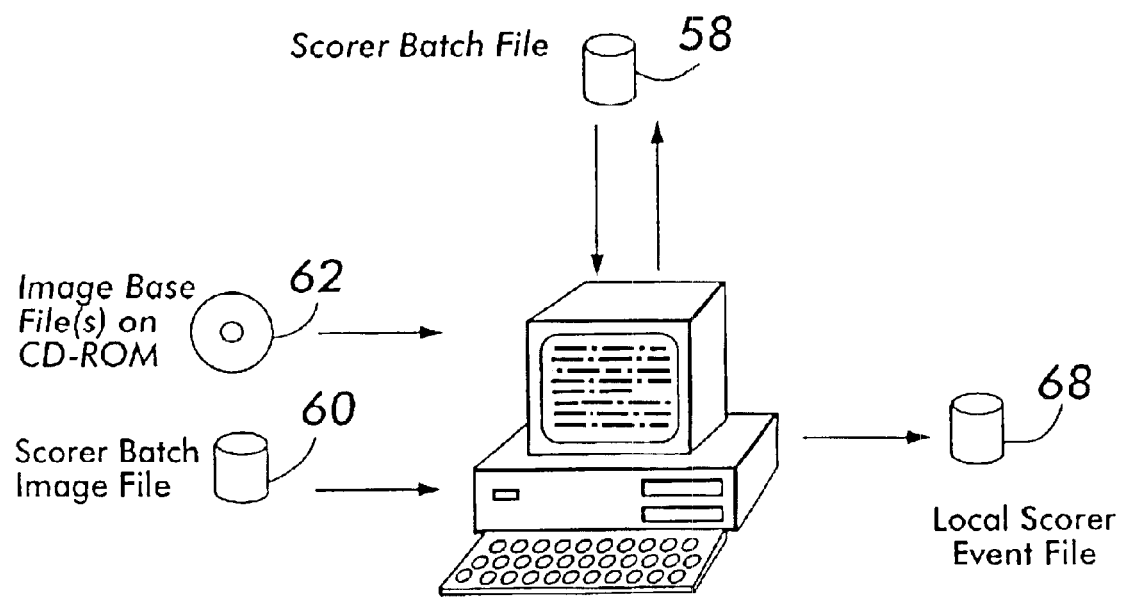
FIG. 12 is a block diagram, showing files and data flow during individual remote scoring with large image files.
Figure 12:
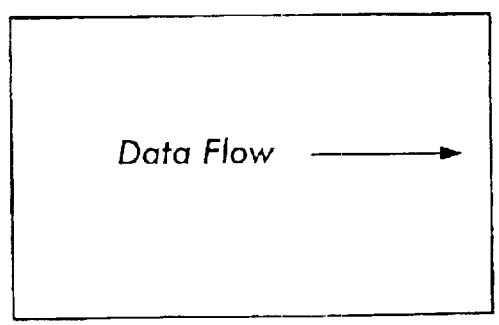

Referring now to FIGS. 11 and 12, in individual remote scoring with large image files, each record in the Scorer Batch File 32 points to a stored image in the ImageBase file 16. A copy of some or all of the ImageBase File 16, written to a recordable CD-ROM 62 at the central site, is sent separately to the scorer so that the image can be read directly from the CD-ROM 62 when placed in the scorer's CD-ROM reader. As with the above-described rapid response scoring technique, the Scorer Batch File 32 is sent electronically from the central system or to the scorer's computer and stored on the scorer's computer's hard drive (not shown) during scoring. After the scorer has completed an activity, the scorer's actions and judgments are taken from the scorer's local Scorer Event File 68 and central Scorer Batch File 58 and processed into the appropriate files on the central system, including the Assessment Scoring File 24, the Scorer Event File 44, the Project Log File 42 and the Scorer Summary File 36.

Recording Scorer's Activities

A significant aspect of the present invention is the fact that all activities by scorers are duly recorded and stored in appropriate files. Every significant event initiated by a scorer, from logging into the system to signing out, is recorded with appropriate date and time information in the Project Log File 42, so that all scorer activities and their times are accurately accounted for. In Network Scoring (FIG. 2), the information is written directly to the Project Log File 42. In Remote Network Scoring (FIG. 5), the information is written to the Local Scorer Event File 54, which is then transferred to the central network Project Log File 42. For Individual Remote Scoring (FIGS. 7, 9 and 11), the information is written to a Local Scorer Event File 68, which is then transferred to the central network Project Log File 42.

Figure 7:
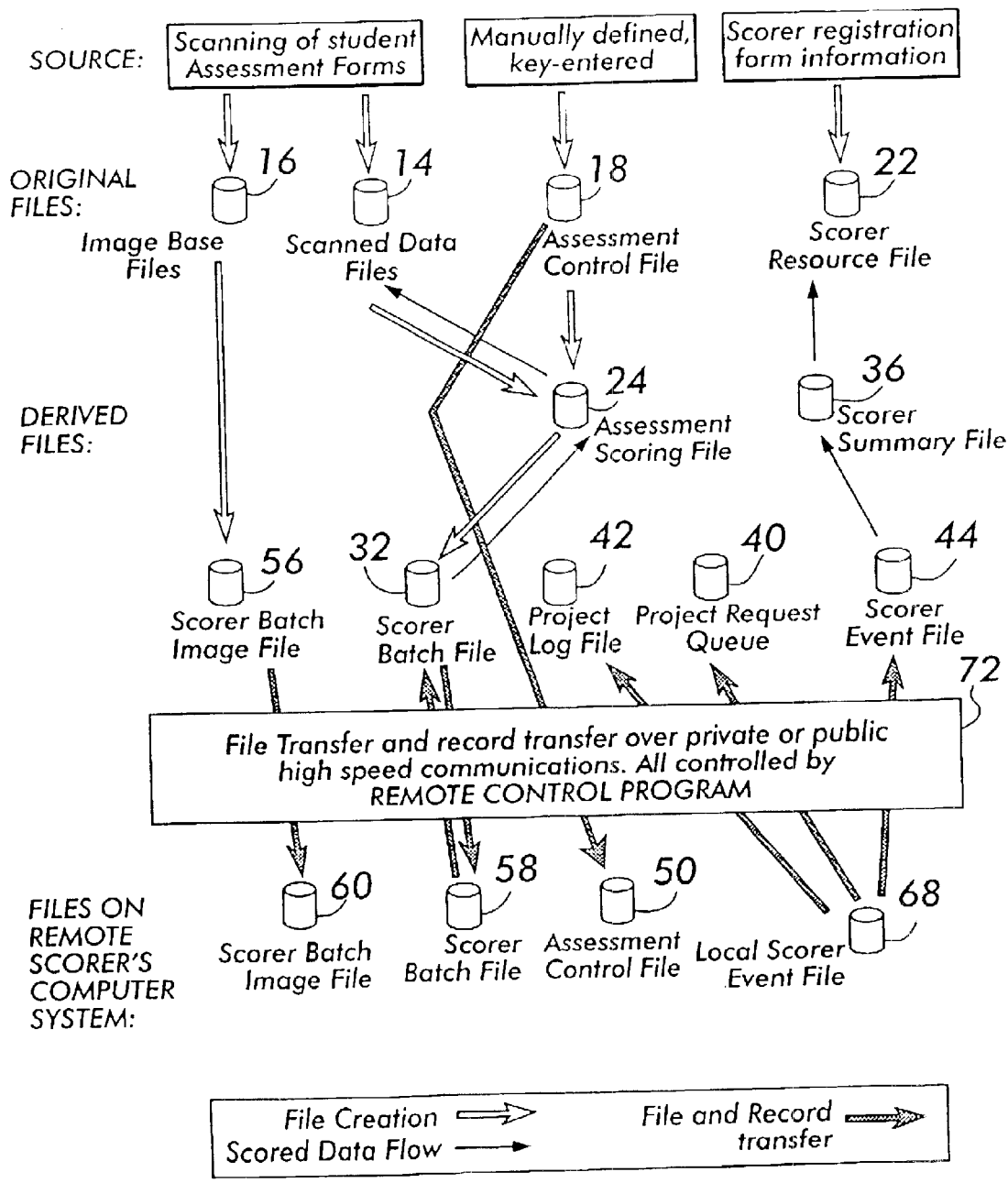
FIG. 7 is a flow diagram, depicting the interrelationship among the computer files used in a system for processing nonobjective assessment materials in a setting with individual remote scoring and high speed distribution of assessment items including images.
Figure 8:
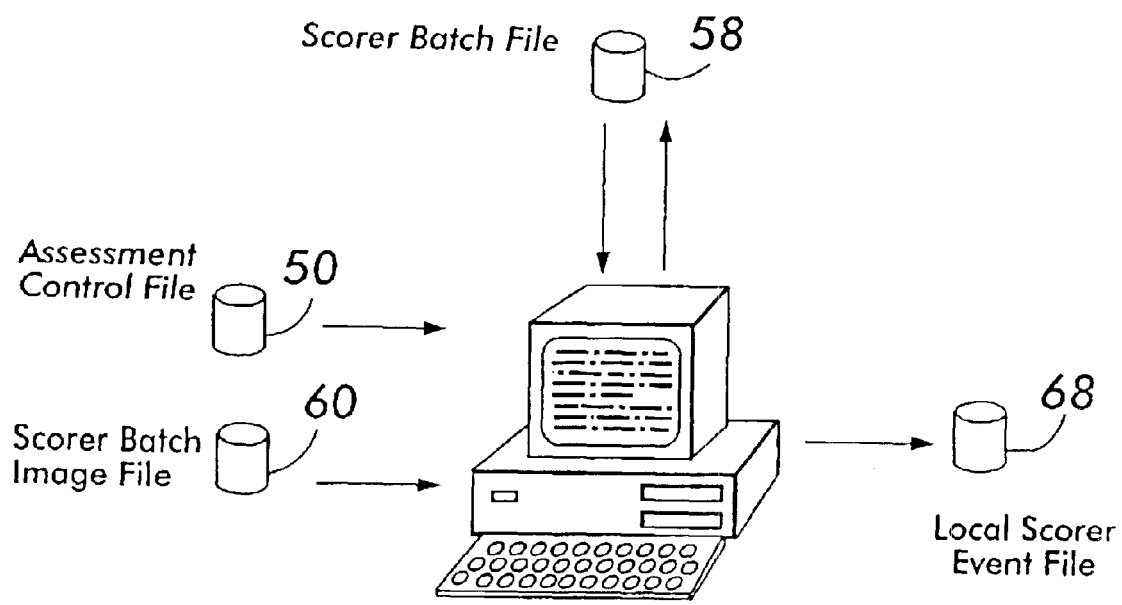
FIG. 8 is a block diagram, showing files and data flow during individual remote scoring with high speed distribution.
Figure 8:
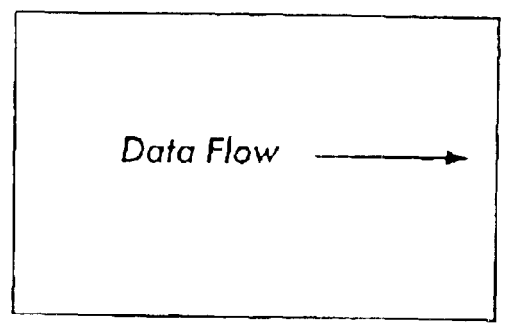
Figure 9:
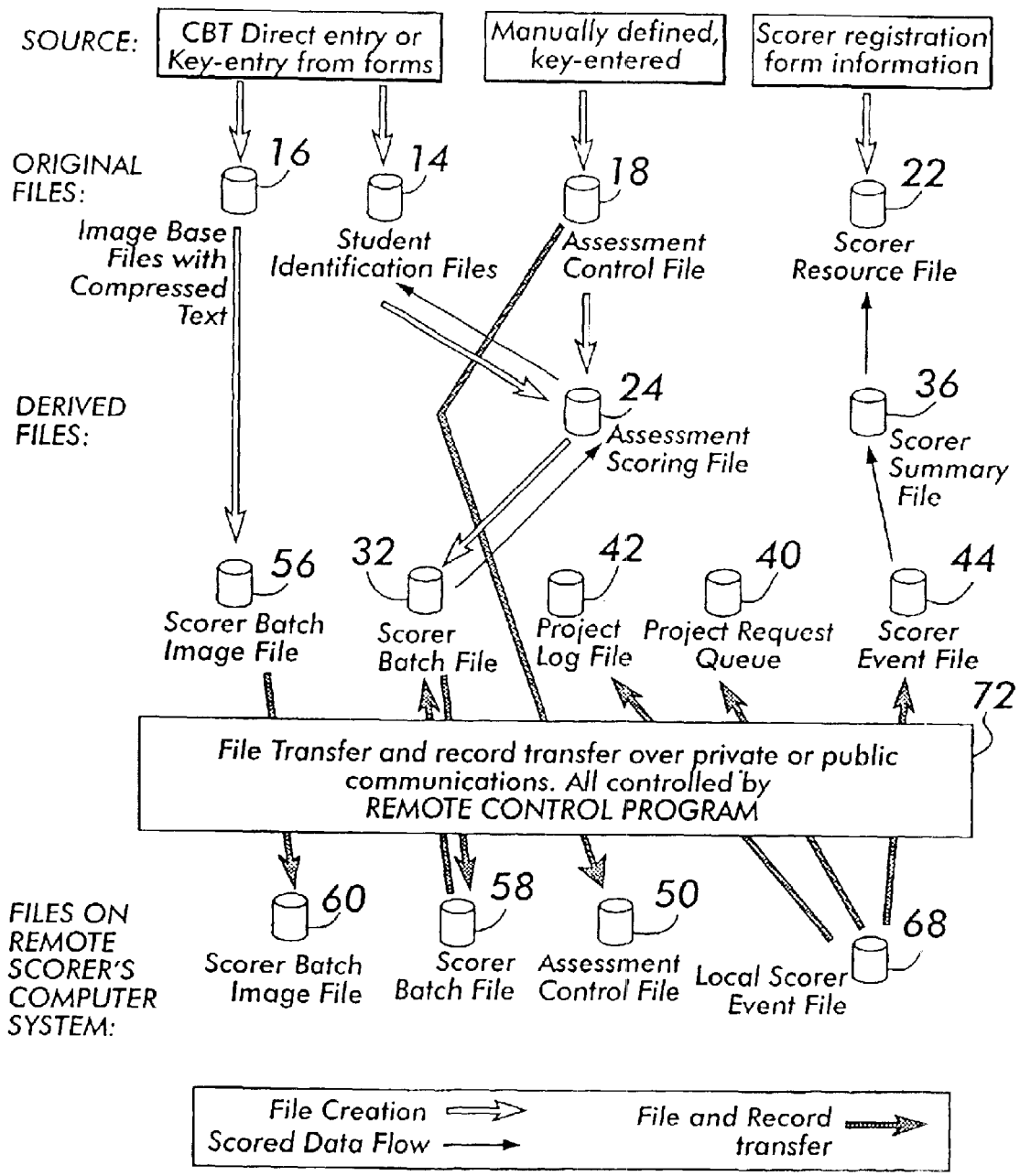
FIG. 9 is a flow diagram, depicting the interrelationship among the computer files used in a system for processing nonobjective assessment materials in a setting with individual remote scoring utilizing text representations of the response.
Figure 10:
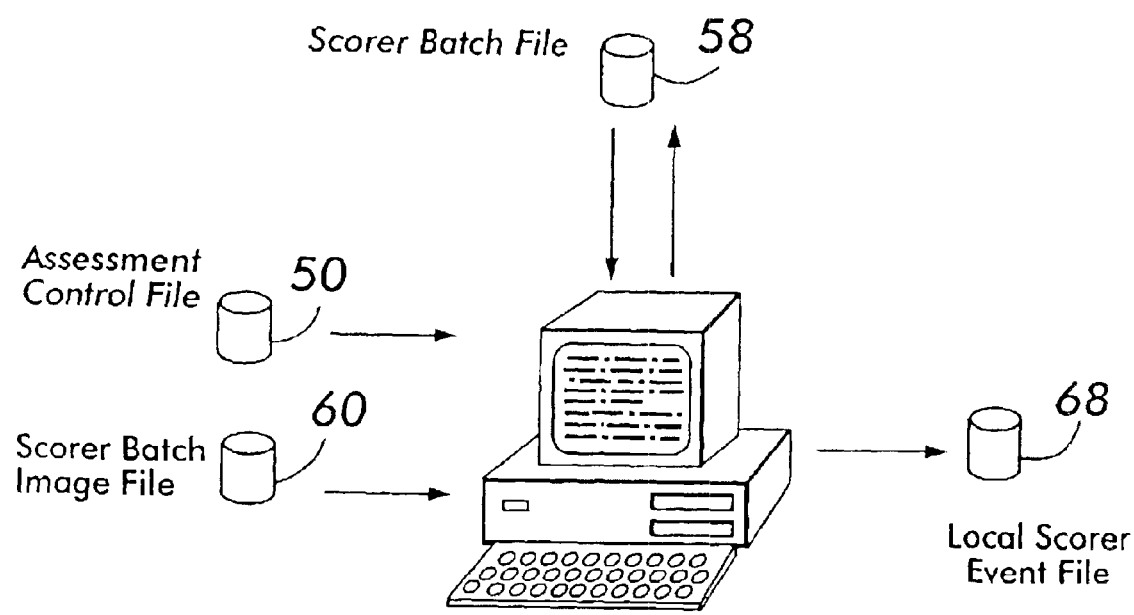
FIG. 10 is a block diagram, showing files and data flow during individual remote scoring with text-based assessments.
Figure 10:
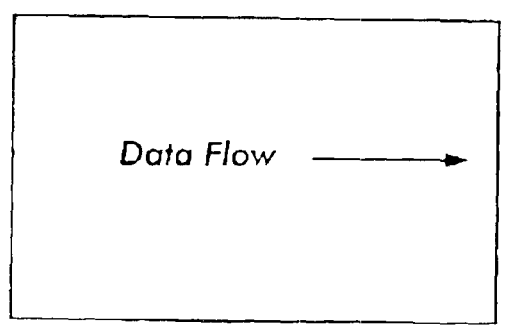

For any given batch of items, information on each assessment item to be scored is stored in the Scorer Batch File (designated by the reference numerals 32 and 52, respectively, for scorers scoring on networks in FIGS. 3 and 5, and by the reference numeral 58 for individual remote scorers as depicted in FIGS. 7, 9 and 11). Based on that information, the appropriate image is obtained from the ImageBase file 16. The physical location of the file containing the image is dependent upon the particular setting, but the same image will be displayed for any given assessment record. In Network Scoring (FIG. 3), the image is displayed directly from the central ImageBase File 16. In Remote Network Scoring (FIG. 5), the image is displayed from a copy 48 of the central system ImageBase File 16. In Remote Individual Scoring with High Speed Electronic Distribution (FIG. 7) or Remote Individual Scoring with Text-Based Assessments (FIG. 9), the images, or compressed text, are stored in a local Scorer Batch Image File 60 which contains images corresponding only to the assessment items in the Scorer Batch File 58. In Remote Individual Scoring with large image files (FIG. 11), the images are stored on CD-ROM 62 in the scorer's computer CD-ROM drive.

Security of Transmission

In the preferred embodiments of Individual Remote Scoring (FIGS. 7, 9 and 11), all electronic transfer and all electronic communication with scorers is performed under the control of a Remote Control Program 72 running on the central LAN, as shown in FIG. 13. To ensure that no one can obtain unauthorized information from the system, the Remote Control Program 72 controls all transmission of data to and from the central site to the individual scorer's computer. All calls are initiated from the remote scorer's system in response to a request by the remote scorer (as described above) for batches or additional batches to score, or the presence of a completed qualifying batch or live batch. Those skilled in the art will recognize that the electronic connection may be implemented through telephone lines using standard modems, through high speed ISDN or alternative high speed connections, or possibly through the Internet or a wide area network. In all cases, the connection is made to the Remote Control Program 72 and not directly onto the central network.

It will be seen in FIG. 13 that the Remote Control program 72 first performs a check on the scorer, typically verifying the identity of the scorer by identification codes, and, when appropriate, through other caller identification processes. If the identity of a caller is not satisfactorily verified, the connection is terminated and project management is notified of an attempted unauthorized connection.

Once a connection has been established and the caller's identity verified, the Remote Control Program 72 first copies all logs of scorer activities to the central file system, taking records from the local Scorer Event File 68 and distributing them to the appropriate files such as the Project Log File 42, the Project Request Queue 40, and the central system Scorer Event File 44. Then the Remote Control Program 72 copies completed batches of scored data from the Scorer Batch File 58 of the scorer's computer to the Scorer Batch File 32 of the central system and instructs the scorer's computer to erase the completed files. For each completed file, the Remote Control Program 72 posts a request in the Project Request Queue 40 so that the information in the completed batch will be processed. In addition to any additional housekeeping tasks, and logging all transmissions in the Project Log File 42, the Remote Control Program 72 transmits any new Scorer Batch Files 32 to the scorer and copies are stored on the scorer's computer at 58. If the scorer is providing Individual Remote Rapid Response Scoring (described above in relation to FIGS. 7 and 9), the Remote Control Program 72 also copies corresponding Scorer Batch Image Files 56 for each Scorer Batch File 32 from the central system onto the scorer's personal computer at 60. Once all activities are done, the Remote Control Program 72 terminates the communication link.

The above-described process is desirable in that it provides a "firewall" to prevent unauthorized access by unauthorized users to any of the files on the central network. Even if an unauthorized user were to establish communication connection with the network, such a user would still be unable to read from or write to files on the network since only the Remote Control Program 72 actually performs any record transactions to or from the files stored on the network.

The present invention may be embodied in other specific forms without departing from its spirit or essential attributes. Accordingly, reference should be made to the claims rather than the foregoing specification as indicating the scope of the invention.

I claim:

1. A method of electronically displaying to a human scorer an image of handwritten nonobjective assessment materials recorded by a test taker in an assessment area of an assessment form, and recording a score entered by the scorer, comprising the steps of:

providing an assessment form having thereon at least one assessment area;

recording in an electronic file information identifying the test taker including at least one of the following: the test taker's name, the test taker's gender, and the test taker's grade level;

recording in an electronic file information identifying the assessment form;

capturing from the assessment form a digitized image of at least a portion of said assessment materials recorded in the at least one assessment area;

storing said digitized image in an electronic image file;

recording in an electronic file information to locate said stored image of said assessment materials;

selectively displaying electronically said stored image of said assessment materials on a computer screen for scoring by the scorer, but not displaying the test taker's name, the test taker's gender, or the test taker's grade level; and recording in an electronic file a score entered by the scorer for the stored digitized image of the assessment materials.

2. The method of claim 1 wherein a test taker code is displayed on the computer screen, the test taker code being selected so that the scorer is unable to deduce information about the identity of the test taker from the code.

3. The method of claim 2 wherein the code is a number.

4. A method of electronically displaying to a human scorer an image of handwritten nonobjective assessment materials recorded by a test taker in an assessment area of an assessment form, and recording a score entered by the scorer, comprising the steps of:

providing an assessment form having thereon at least one assessment area;

recording in an electronic file the test taker's name;

recording in an electronic file information identifying the assessment form;

capturing from the assessment form a digitized image of said assessment materials recorded in the at least one assessment area;

storing said digitized image in an electronic image file;

recording in an electronic file information to locate said stored image of said assessment materials;

selectively displaying electronically said stored image of said assessment materials on a computer screen for scoring by the scorer, but not displaying the test taker's name; and recording in an electronic file a score entered by the scorer for the stored digitized image of the assessment materials.

5. A method of electronically scoring nonobjective assessment materials recorded by test takers, comprising the steps of:

creating digitized electronic representations of the nonobjective assessment materials, the nonobjective assessment materials including a plurality of assessment items;

storing the digitized representations in a file;

creating and maintaining a file of data that relates each assessment material item to the test taker who recorded the material;

creating and maintaining a file of data that identifies:
        a group of human scorers who are authorized to request the assessment materials; and
        the qualifications of each of the group of human scorers to score assessment materials;

providing a means for a scorer in the group of human scorers to request assessment materials to be displayed on a monitor;

processing a request by the scorer for the display of assessment materials by selecting items of assessment material for the scorer to score by:
        referring to the file data that identifies the scorer and the qualifications of the scorer, and
        selecting in response to the request only assessment material items which the scorer is authorized and qualified to score;

displaying the selected assessment material to the scorer, without displaying the test taker's name, gender, or educational grade level;

providing the scorer a means to electronically record scores for assessment material; and electronically storing scores recorded by the scorer for the assessment material.

6. A computer-readable medium embodying code for electronically scoring nonobjective assessment materials recorded by test takers by performing the steps of:

creating digitized electronic representations of the nonobjective assessment materials, the nonobjective assessment materials including a plurality of assessment items;

storing the digitized representations in a file;

creating and maintaining a file of data that relates each assessment material item to the test taker who recorded the material;

creating and maintaining a file of data that identifies:
        a group of human scorers who are authorized to request the assessment materials and
        the qualifications of each of the group of human scorers to score assessment materials;

providing a means for a scorer in the group of human scorers to request assessment materials to be displayed on a monitor;

processing a request by the scorer for the display of assessment materials by selecting items of assessment material for the scorer to score by:
        referring to the file data that identifies the scorer and the qualifications of the scorer; and
        selecting in response to the request only assessment material items which the scorer is authorized and qualified to score;

displaying the selected assessment material to the scorer, without displaying the test taker's name, gender, or educational grade level;

providing the scorer a means to electronically record scores for assessment material; and electronically storing scores recorded by the scorer for the assessment material.

7. A method of electronically displaying to a human scorer a nonobjective assessment material authored by a test taker in response to an assessment form and recording a score entered by the scorer, comprising the steps of:

electronically receiving from a test taker an assessment material comprising character strings of text authored by the test taker;

recording the assessment material in an electronic assessment file;

recording in an electronic file information identifying the test taker;

recording in an electronic file information identifying the assessment form;

selectively displaying on a computer screen the assessment material for scoring by a scorer and a code corresponding to the test taker, but not displaying said information identifying the test taker, whereby the scorer is prevented from considering information identifying the test taker; and recording in an electronic file a score entered by the scorer for the stored digitized image of the assessment materials.

8. A method of electronically displaying to a human scorer a nonobjective assessment material authored by a test taker in response to an assessment form and recording a score entered by the scorer, comprising the steps of:

scanning a plurality of pages of responses to non-objective assessment items to produce a plurality of scanned images, each scanned image including at least one response to a nonobjective assessment item;

loading the scanned images into a processing system;

presenting the scorer with at least a portion of at least one of the scanned images, the portion of the scanned image including at least one response to a nonobjective assessment item, the portion of the scanned image further including coded information corresponding to the test taker, the coded information being provided in a manner such that the scorer cannot deduce the identity of the test taker, so as to preserve the test taker's anonymity;

receiving a score from the scorer;

recording the score from the scorer.

9. A system for electronically displaying to a human scorer a nonobjective assessment material authored by a test taker in response to an assessment form and recording a score entered by the scorer, comprising:

a scanning system configured to scan a plurality of pages of responses to nonobjective assessment items to produce a plurality of scanned images, each scanned image including at least one response to a non-objective assessment item;

a processing system configured to receive and store the scanned images;

a presenting system configured to present the scorer with at least a portion of at least one of the scanned images, the portion of the scanned image including at least one response to a nonobjective assessment item, the portion of the scanned image further including information identifying the test taker that is provided in a manner such that the scorer cannot deduce the identity of the test taker;

a receiving system configured to receive a score from the scorer;

a recording system configured to record the score from the scorer.

10. The system of claim 9 wherein the processing system comprises the receiving system.

11. The system of claim 9 wherein the processing system comprises the recording system.

12. A system for electronically displaying to a human scorer a nonobjective assessment material authored by a test taker in response to an assessment form and recording a score entered by the scorer, comprising:

means for scanning a plurality of pages of responses to non-objective assessment items to produce a plurality of scanned images, each scanned image including at least one response to a nonobjective assessment item;

means for receiving the scanned images;

means for storing the scanned images;

means for presenting the scorer with at least a portion of at least one of the scanned images, the portion of the scanned image including at least one response to a nonobjective assessment item, the portion of the scanned image further including information corresponding to the test taker that is provided in a manner such that the scorer cannot deduce the identity of the test taker;

means for receiving a score from the scorer;

means for recording the score from the scorer.

13. A computer-readable medium embodying code for electronically displaying to a human scorer a nonobjective assessment material authored by a test taker in response to an assessment form and recording a score entered by the scorer by performing the steps of:

scanning a plurality of pages of responses to non-objective assessment items to produce a plurality of scanned images, each scanned image including at least one response to a nonobjective assessment item;

loading the scanned images into a processing system;

presenting the scorer with at least a portion of at least one of the scanned images, the portion of the scanned image including at least one response to a nonobjective assessment item, the portion of the scanned image further including coded information corresponding to the test taker, the coded information being provided in a manner such that the scorer cannot deduce the identity of the test taker, so as to preserve the test taker's anonymity;

receiving a score from the scorer;

recording the score from the scorer.

* * * * *